Figure 4:
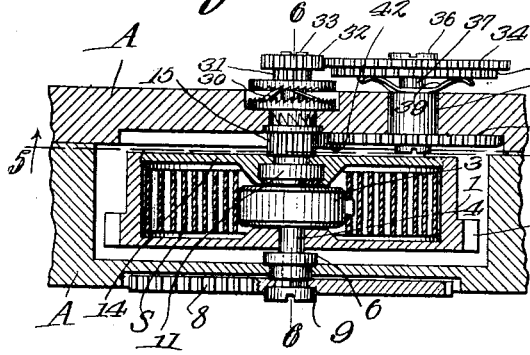

C. TESKE.
WINDING INDEX FOR INDICATOR MECHANISM FOR TIMEPIECES, MUSICAL AND OTHER MECHANISMS.
APPLICATION FILED APR. 18, 1914.
1,173,466.
Patented Feb. 29, 1916.
5 SHEETS—SHEET 1.
Fig. 1.
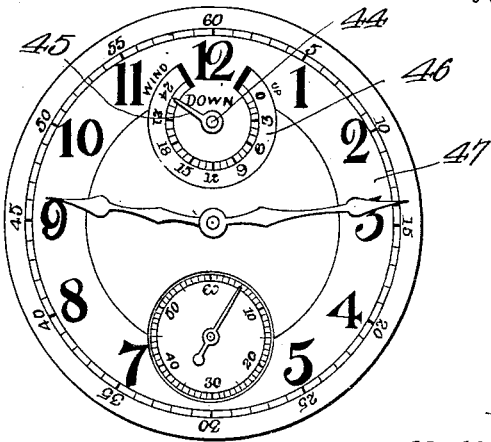
Fig. 2.
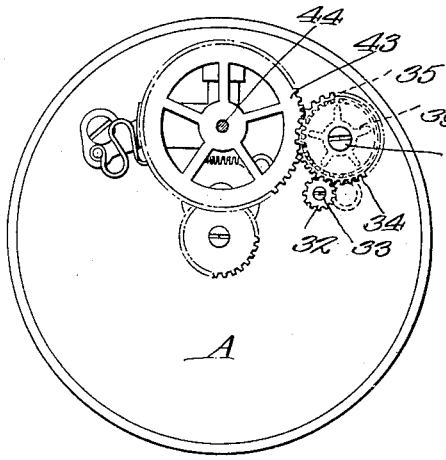
Fig. 3.
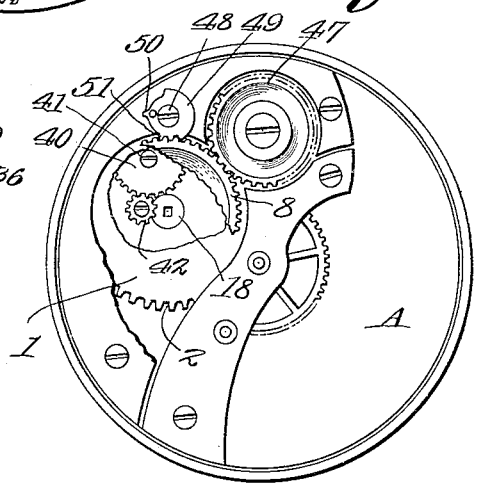
Fig. 9.
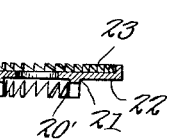
Fig. 11.
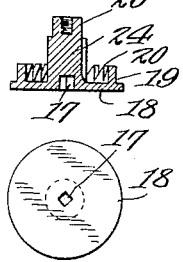
Fig. 8.
Fig. 10.
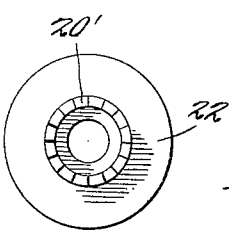
Fig. 12.
Witnesses
Charles Teske, Inventor,
by C. A. Snow & Co.
Attorneys.

C. TESKE.
WINDING INDEX FOR INDICATOR MECHANISM FOR TIMEPIECES, MUSICAL AND OTHER MECHANISMS.
APPLICATION FILED APR. 18, 1914.

1,173,466.

Patented Feb. 29, 1916.
5 SHEETS—SHEET 2.

Charles Teske
Inventor,

Witnesses
by C. A. Snow & Co.
Attorneys.

C. TESKE.
WINDING INDEX FOR INDICATOR MECHANISM FOR TIMEPIECES, MUSICAL AND OTHER MECHANISMS.
APPLICATION FILED APR. 18, 1914.
1,173,466.  Patented Feb. 29, 1916.
5 SHEETS—SHEET 3.
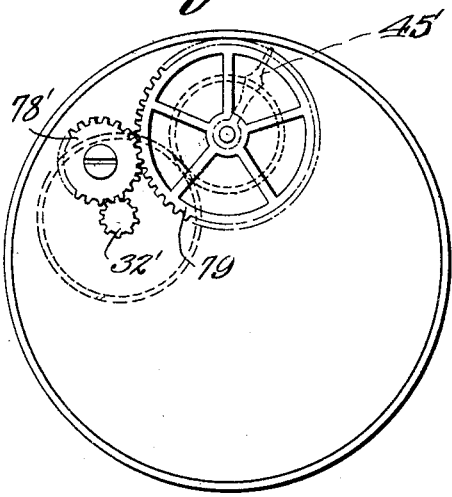
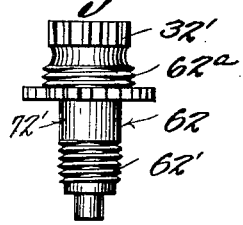
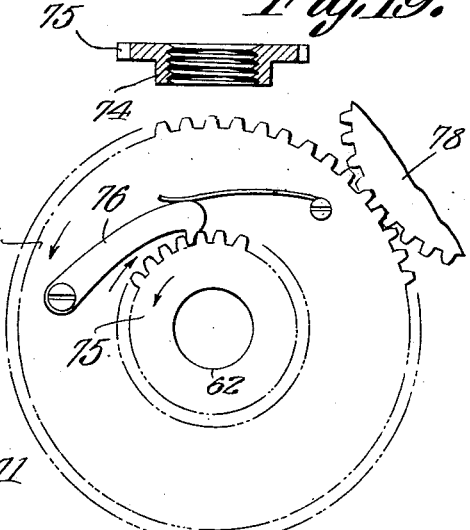
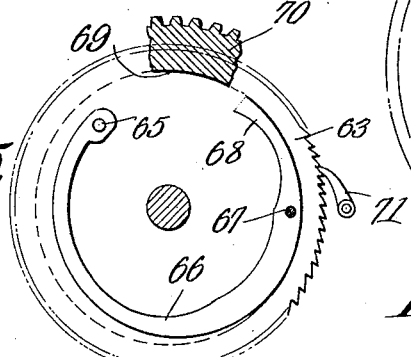
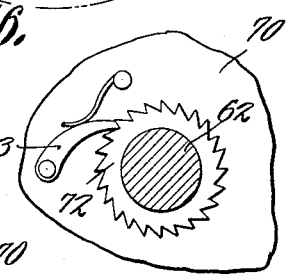
Charles Teske
Inventor,
by C. A. Snow & Co.
Attorneys.

C. TESKE.
WINDING INDEX FOR INDICATOR MECHANISM FOR TIMEPIECES, MUSICAL AND OTHER MECHANISMS.
APPLICATION FILED APR. 18, 1914.
1,173,466.
Patented Feb. 29, 1916.
5 SHEETS—SHEET 4.
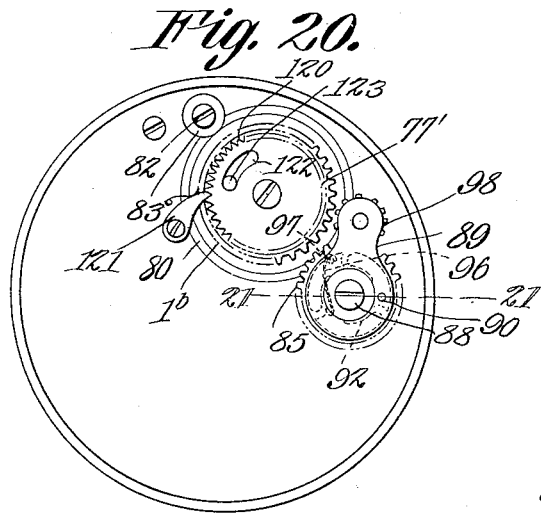
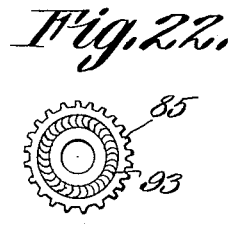
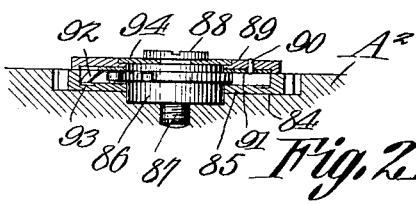
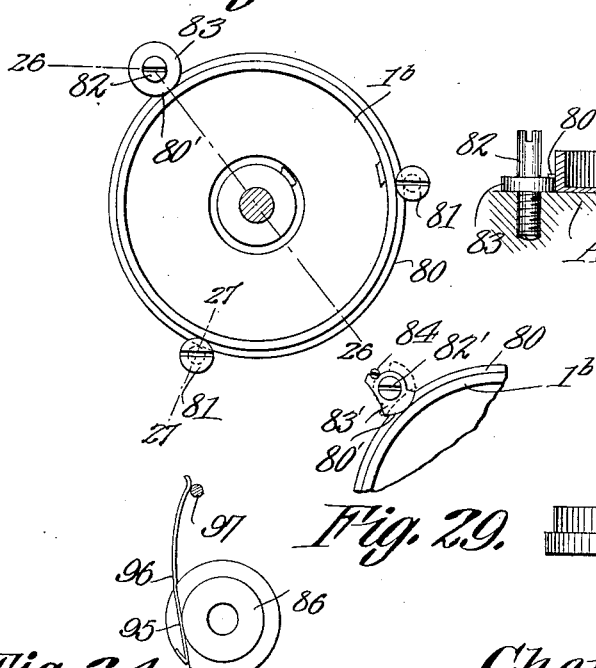
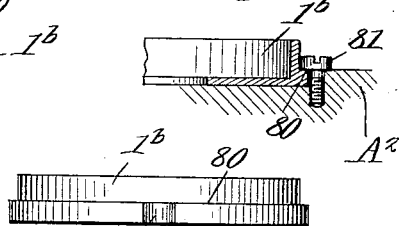
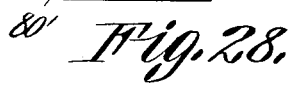
Charles Teske
Inventor,
by C A Snow & Co.
Attorneys.
Witnesses C. TESKE.
WINDING INDEX FOR INDICATOR MECHANISM FOR TIMEPIECES, MUSICAL AND OTHER-MECHANISMS.
APPLICATION FILED APR. 18, 1914.

1,173,466.  Patented Feb. 29, 1916.
5 SHEETS—SHEET 5.

Witnesses
Charles Teske
Inventor,
by C. A. Snow & Co.
Attorneys.

UNITED STATES PATENT OFFICE.

CHARLES TESKE, OF WILDROSE, NORTH DAKOTA.

WINDING-INDEX FOR INDICATOR MECHANISM FOR TIMEPIECES, MUSICAL AND OTHER MECHANISMS.

1,173,466. Specification of Letters Patent. Patented Feb. 29, 1916.

Application filed April 18, 1914. Serial No. 832,934.

*To all whom it may concern:*

Be it known that I, CHARLES TESKE, a citizen of the United States, residing at Wildrose, in the county of Williams and State of North Dakota, have invented a new and useful Winding-Index for Indicator Mechanism for Timepieces, Musical and other Mechanisms, of which the following is a specification.

The present invention relates to a winding index or indicator mechanism, and especially to a winding mechanism for time movements in watches, clocks or other power driven mechanism in which the movement of the driven members are imparted by force stored up in a previously wound spring cord or other winding device.

The principal feature of this invention is the provision of an improved device for watches, clocks and time movements to indicate by a dial and hand, or by an audible signal, the limit of winding, and also the limit of unwinding, such indicator indicating the number of hours the mechanism has been running after the same has been fully wound so that the same may be rewound before it has fully unwound, thus permitting the motor to be wound before the full stoppage thereof, especially of watches or clocks, whereby the accurate time would not only be lost, but a variation would take place on these otherwise accurate time pieces due to the tendency of the main spring growing perceptibly weaker as it runs down, especially after it has run twenty-four hours, subsequent to its having been fully wound.

This invention is especially designed to make the present high grade watches which run with a variation of but a few seconds per week or month, more serviceable, as such close time pieces by placing before the owners, an index consisting of a pointer or hand in connection with a dial having figures thereon, from 1 to 24, whereby they can at a glance observe whether the watch has been wound or not at the proper time, that is exactly twenty-four hours after its winding, the index consisting of a special dial and hand, is a constant silent reminder of what has been done in reference to the winding of the time piece and as to what should be done to prevent the time piece from running down, which in exceedingly accurate time pieces is undesirable for the reason that after a fine regulation of such time piece and a subsequent stoppage thereof, or the irregular winding thereof a re-regulation would be necessary.

It is therefore the object of the present invention to provide a winding index or indicator mechanism which is applicable to any of the high grade watches now made, and which will indicate at a glance the relative condition of the spring of such time piece.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 6:
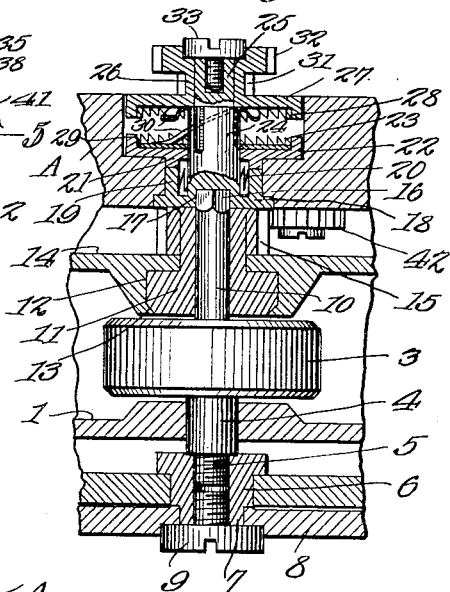
Figure 5:
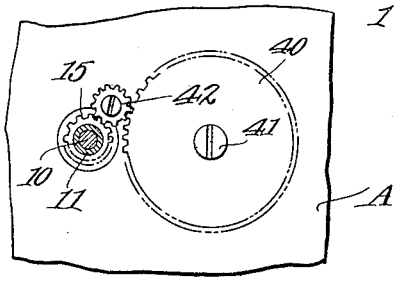
Figure 30:
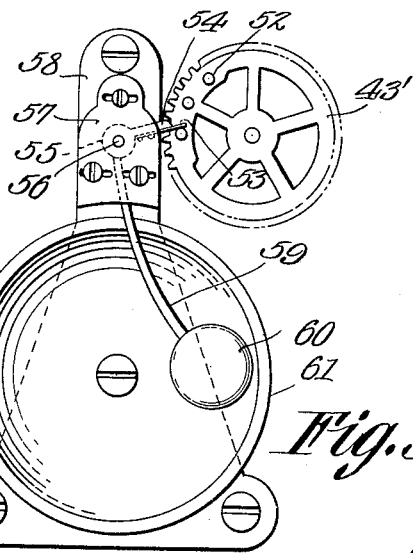
Figure 7:
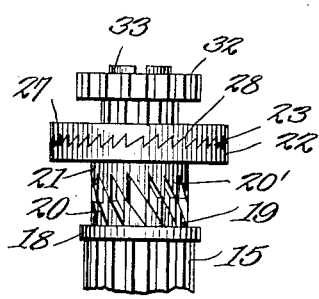
Figure 31:
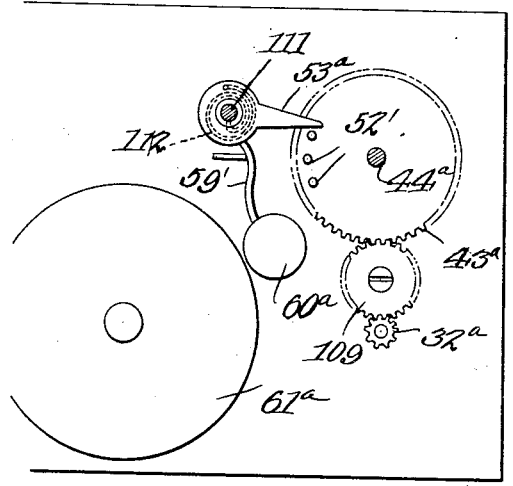
Figure 32:
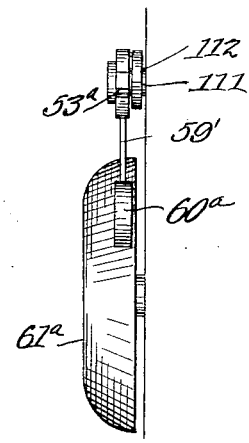
Figure 33:
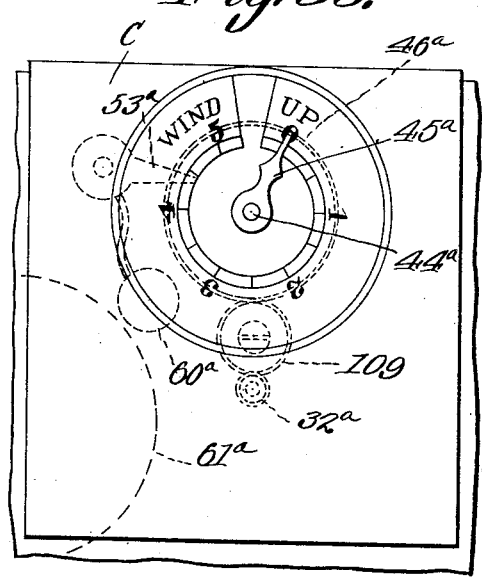
Figure 34:
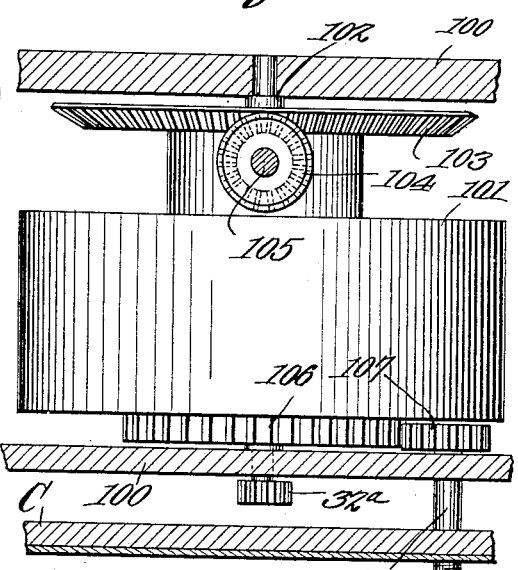

In the drawings:—Figure 1 is a front view of the dial of a watch showing the position of the visual indicator of the present invention. Fig. 2 is a front view with the dial removed, the winding indicator mechanism being here shown as operably connected to an Illinois Watch Company pendant stem winding watch. Fig. 3 is a view in elevation and partly in section of the same watch taken from the main plate and center bridge side thereof, with the spring or winding wheel shown in section. Fig. 4 is a cross sectional view through the main spring barrel, and the adjacent mechanism for operating the indicator hand of the present winding index. Fig. 5 is a section taken on line 5—5 of Fig. 4. Fig. 6 is an enlarged view taken on line 6—6 of Fig. 4. Fig. 7 is an enlarged detail view of the clutches employed in connection with the present winding index. Figs. 8, 9, 10, 11 and 12 are detail views of various parts of the clutch. Fig. 13 is a plan view partly in section showing a modified form of operating means for winding index especially adapted for use in connection with an arbor and driven spring. Fig. 14 is a cross section through the spring casing and the adjacent mechanism of the device as shown in Fig. 13. Fig. 15 is a bottom plan view of the connection between the arbor and the time train mechanism, whereby the time train mechanism is not impeded during the winding of the spring. Fig. 16 is a detail plan view of the pinion actuated wheel whereby the spring arbor is wound. Fig. 17 is a plan view of a small ratchet wheel and pawl connected adjacent to the winding wheel of the arbor. Figs. 18 and 19 are detail views of the arbor and the ratchet wheel carried thereby. Fig. 20 is an enlarged detail view showing one method of connecting and disconnecting the winding pinion for winding the arbor. Fig. 21 is a cross section taken on line 21—21 of Fig. 20. Figs. 22, 23 and 24 are detail views of the various parts of the winding pinion connecting mechanism. Fig. 25 is a top plan view of the spring casing showing the method of locking the same in the watch movement. Fig. 26 is a section taken on line 26—26 of Fig. 25. Fig. 27 is a section taken on the line 27—27 of Fig. 25. Fig. 28 is a side elevation of the spring casing showing the locking recess therein. Fig. 29 is an enlarged detail view showing a modified form of locking mechanism for the spring casing. Fig. 30 is a detail plan view showing the form of mechanism used in connection with an audible alarm. Fig. 31 is a plan view showing the present winding index as applied to a sound reproducing machine. Fig. 32 is a side elevation showing the bell striker and bell of the mechanism shown in Fig. 31. Fig. 33 is a plan view of the dial, dotted lines illustrating the position of the parts as shown in Fig. 31. Fig. 34 is a top elevation partially in section showing a sound reproducing machine motor and the relative position of the pinion for operating the winding index.

Referring to the drawings, A designates the frame for supporting the works of the present movement, there being mounted therein, the main spring barrel 1 having the peripheral teeth 2 of usual structure, the cylindrical enlargement 3, which is carried by the spindle or shaft 4 being disposed within the barrel and having connected thereto one terminal of the main spring S, while the other terminal is connected to the barrel 1. The lower end of the spindle 4 is threaded as at 5 into the bushing 6 which is mounted in the frame of the watch movement, the further reduced end 7 of the bushing 6 being of irregular shape for the reception of the winding wheel 8, the screw 9 being employed for holding the winding wheel 8 in proper relation. Thus movement is imparted to the spindle 4 and the spring is wound as the winding wheel 8 is rotated. A bushing 11 surrounds the upper reduced end 10 of the spindle 4 so that said spindle will rotate freely therein, the enlarged end 12 of the bushing 11 being seated within the cup 13 formed in the under side of the plate 14, said bushing being of a hard metal while the plate 14 is of a softer metal, so that a hard bearing is produced for the reduced end 10 of the spindle 4. The mouth of the socket 13 is spun inwardly so as to lock the bushing 11 rigidly to the plate 14. Connected fixedly to the rigidly reduced end of the bushing 11 exteriorly of the plate 14, is a gear 15, the purpose of which will presently appear. The upper end of the reduced spindle 10 is squared as at 16 and is insertible within the square socket 17 of the spindle 24. This spindle 24 at one end where it is set into the main plate of the movement is flanged as at 18 and is provided with the sleeve 19 having the cam teeth 20. A sleeve 21 is mounted freely for rotation upon the shaft 24 within the oppositely disposed recessed portion of the movement frame and is provided with cam teeth 20' for coaction with the cam teeth 20 so that the member 19 will be secured to rotate the member 22. The member 22 is provided with an upstanding toothed rim 23, which constitutes a clutch member, that is elevated, due to the rotation of the member 4 and the consequent sliding of the clutch teeth 20 upon the teeth 20' to properly operate the clutch as will presently appear. The stud or stem 24 is provided with the reduced end 25, upon which is mounted the member 26, said member 26 being provided with a disk 27 having the clutch teeth 28 for coaction with the teeth 23 of the member 22, there being interposed between the members a plate 29 provided with a plurality of resilient or spring arms 30 which bear against the under side of the plate 27 to hold the member 22 downwardly with the teeth 23 normally out of engagement with the teeth 28. Thus as the winding barrel or member 3 is operated to wind the spring, the stem 10 will operate the spindle 24 and as the member 18 is also rotated therewith, the teeth 20 will ride under the teeth 20' elevating the plate 22 so that the teeth 23 are placed in engagement with the teeth 28 of the clutch member 27, thus causing the clutch member 27 to rotate with the clutch member 22 and rotate the reduced pinion 31 and the enlarged pinion 32 both of which are secured to and rotate with the clutch member 27. A screw 33 is mounted to hold the upper clutch member 27 fixedly upon the reduced end 25 of the stem or spindle 24.

The reduced end 37 of the shaft 38, which is journaled in the frame of the watch movement has attached thereto, for independent rotation, the two gears 34 and 35 which bear together frictionally, a screw 36 acting as a limiting means to hold the said gears 34 and 35 against displacement, while the spring member 39 which has a plurality of arms, engages the stem or shaft 38 and the under side of the gear 35 so that the gears 35 and 34 will rotate with the stem 38. The friction between the contacting faces of the gears 34 and 35 will naturally be greater than that between the gear 35 and spring 39, so that the gear 35 will tend to turn with the gear 34.

A gear 41 is attached to the other end of the stem or shaft 38, and is in mesh at all times with the intermediate pinion 42 which is in mesh with the pinion 15, the purpose of which will presently appear.

Meshing at all times to be driven by the gear 35 is a gear 43, which is attached to the arbor 44 projected through the dial 47 and carries the indicating hand 45. This indicating hand is disposed to point to the various digits of the winding indicator dial 46 which is printed or formed upon the dial 47, as clearly shown in Fig. 1.

It will thus be seen that when the winding wheel 8 is operated to rotate the spindle 4, that the hand 44 will be moved from 24 toward O or in the opposite direction to that indicated in Fig. 1, the release of the winding action permitting the springs 30 to depress the clutch member 22 so that the main spring action upon the barrel 1 will rotate the gear 15 and through the gears 42 and 40 rotate the spindle or shaft 38, such action operating the gear 35 to move the gear 43 in such direction as to move the hand 45 toward the word "wind" or the numeral 24. As the gear 32 and the upper clutch member 27 is free to rotate upon the reduced end 25 of the stem 24, the gear 34 at this time will rotate such members without undue friction upon the remaining train.

In order to provide a means to prevent the too far winding of the main spring, the gear 8 being turned from the winding gear 47, a screw 48 is employed to secure the mutilated gear 49 in place, said gear being provided with one tooth 50 and with a plurality of teeth 51, which constitute a "click" to let down the spring and thus assist in preventing the too far winding of the spring through the gear 8.

In Figs. 13 through 29, are illustrated types of watches in which the spring case is held fixedly and the arbor is operated to wind the spring and to also impart movement to the time train of the watch.

As illustrated in Fig. 14, the casing 1ª is seated and locked within the frame plate A', the winding and operating arbor 62 being disposed as usual and connected to the spring (not shown). Mounted for rotation about the arbor upon the cylindrical portion 72' thereof, is a gear 63, and this gear is provided with a recess 64 in which fits the pin 65 carried in the free end of the maintaining spring 66, said spring 66 being connected by a pin 67 in the recess 69 of the ratchet wheel 70 and so disposed as to be put under tension when the wheel 63 is engaged by the pawl 71, during the winding of the main spring, thus preventing the stoppage of the time train during the winding of the spring. In order that the gear 70 may be driven from the arbor 62, a ratchet wheel 72 is engaged by the spring actuated pawl 73 carried by the gear 70, the winding of the arbor 62 causing the ratchet 72 to rotate without imparting motion to the gear 70, the pawl 73 being active only when the arbor 62 is operated by the spring to in turn operate the watch movement.

In order to provide a means whereby the spring is wound, the gear 77 is mounted for free rotation upon the cylindrical portion 74 and is set down into the frame of the watch so as to be engaged by the gear 78, which in turn is operated by the usual pinion. The gear 75 is fixed upon the arbor 62 and is adapted to be engaged by the spring actuated pawl 76 carried by the gear 77 when the gear 78 is operated to wind the spring, the pawl 76 when the arbor 62 is operated by the spring, being moved in an opposite direction does not connect the gear 75 to the gear 77 and thus the gear 75 is stationary.

Carried upon the free end of the arbor 62 is the small pinion 32' which corresponds to the gear 32 heretofore described, the same in this instance being in mesh with the gear 78' and through this gear operating the gear 79 and consequently the pointer or indicator 45' of the winding index. It will thus be seen that as the arbor 62 is moved to wind the spring, that the pinion 32' will be moved in a direction to move the pointer 45' to indicate that the spring is being wound while when the arbor 62 is being operated by the wound spring, the gear 32' will be operated and moved in the opposite direction, to thus move the indicator 45' in the opposite direction and to indicate that the spring is unwinding.

The spring carrying casing 1ᵇ, as illustrated in Figs. 20 through 29, is provided with a peripheral rim 80 which is recessed as at 80' and such casing is adapted to be seated within the recess in the casing or frame A² and be held therein by means of the screw 81, the screw 82 having fixed thereon the disk 83, so that the disk 83 may be moved into and out of the recess 80' constituting a lock to hold the casing 1ᵇ against rotation and consequently against the tension of the spring mounted therein when the same is wound.

In Fig. 29 in lieu of the disk 83 carried by the screw 82, a cam 83' mounted upon a screw 82' and limited in its movement by the pin 84, is provided.

In both these instances, when it is desired to let the spring down, it is merely necessary to raise the disk 83 to rotate the screw 82 until the disk is out of the recess 80', at which time the casing 1ᵇ will be rotated under the tension of the spring until the same runs down. When the cam 83' is used it is merely necessary to swing the cam to the dotted line position as shown in Fig. 29 at which time the casing 1ᵇ is released to permit the free unwinding of the spring. By this means, the spring casings of this character are readily let down, in an exceedingly simple and effective manner.

In the form as particularly illustrated in Figs. 20 through 24, a novel mechanism for winding the arbor is provided, it comprising primarily, the gear 85 apertured to rotate freely upon the shoulder 86, which is disposed upon the screw 87 and held fixedly within the frame A² thereby. The yoke 89 is mounted for oscillation and properly held in place by means of the washer 94 and the head 88 of the screw 87.

A pin 90 is an attaching means for holding the spring washer 91 to the under side of the yoke 89, above the recessed portion of the gear 85, the spring terminals 92 of the washer 91 being disposed to engage the corrugated portion 93 of the gear 85 so that when the gear 85 is operated through the stem winding pinion (not shown), sufficient friction will be provided between the gear 85 and the yoke 89 to swing the yoke so that the gear 98 will be placed in mesh with the gear 77' so that the winding arbor of the spring will be properly wound. In order to provide an automatic release to move the yoke 89 so that the gear 98 will be placed out of mesh with the gear 77', the spring 96 which is fitted in the recess 95 of the member 86 is provided, the free end thereof engaging the pin 97 secured to and carried by the under side of the yoke 89.

It will thus be seen that with the present form of winding index, that the same is readily applicable to both the spring mechanisms in which the casing and arbor are actuated by a spring or actuated to wind the spring, and where the arbor only is operated to wind the spring and to in turn drive the time train.

Although the present mechanisms heretofore described have been shown as applied to time pieces, it is evident that the same may be applied to indicate the condition of the springs of other types of motors, and as particularly illustrated in Figs. 30 through 34 as applied to the spring motor of a sound reproducing machine.

As shown in Fig. 30, the wheel 43' which is similar to the wheel 43 heretofore described, is provided with a plurality of pins 52, which are disposed in the path to engage a finger arm 53 supported upon the member 54. This member 54 is provided with the spindle 55 which is mounted upon the pin 56 between the two plates 57 and 58. A rod 59 carries a clapper or hammer 60, which is connected to the spindle 55 so that when the arm 53 is released after engaging one of the pins 52, the clapper 60 will engage the bell 61 and operate the same to indicate that the spring motor needs rewinding.

In the construction shown in Figs. 31 through 34, the sound reproducing machine frame 100, has mounted therein, the spring motor casing 101, and the casing 101 is mounted to operate the bevel gear 103 and through it the small bevel pinion 104 and its shaft 105 which is connected as is usual to the record carrier or platform (not shown). The gear 106 is the gear for operating the arbor 102 and the same is operated by the gear or pinion 107 carried by the winding stem 108. A pinion 32ᵃ which corresponds with the pinion 32 heretofore described, is carried upon the outer end of the arbor 102, and meshes with the pinion 109 which in turn meshes with the gear 43ᵃ and consequently operates the arbor 44ᵃ and the indicator 45ᵃ so as to indicate the condition of the spring through the dial 46ᵃ carried by the casing C. Carried upon the face of the gear 43ᵃ, are a plurality of pins 52' which are disposed in the path to engage the trigger arm 53ᵃ.

The trigger 53ᵃ is mounted for rotation upon the stem or shaft 111 for free movement while the spring 112 is connected to the arm 52ᵃ and to the spindle or shaft 111, so as to provide a resilient connection therebetween for imparting the necessary movement to the rod 59' and the hammer or clapper 60ᵃ so that the bell or audible alarm 61ᵃ may be struck at the proper time.

While the respective dials and audible alarms 61 and 61ᵃ are shown, it is evident that electrical contacts may be used whereby a circuit is closed to energize an alarm at a distant point, and that such alarm may constitute either an audible or visual one to indicate that the spring needs rewinding.

As shown in Fig. 20, the ratchet wheel 120 superposes the gear 77', a pawl 121, being disposed to engage the same so that when the gear 77' is operated to wind the spring, the pin 123 will move to the opposite end of the arcuate slot 122 of the wheel 120 before the spring will be started, this means preventing a too far winding of the main spring, and as now particularly set forth in my U. S. Letters Patent No. 607,144 granted to me July 12, 1898.

What is claimed is:

1. The combination with a spring motor, and means for winding the spring thereof, of an indicator mechanism for the condition of the spring connected for movement in one direction during the winding of the spring and for movement in the other direction during the unwinding of the spring, such indicating mechanism, including a gear connected to the driving portion of the spring, a clutch connected to the winding portion of the spring, a shaft, a gear connected to one end thereof and in mesh with the first mentioned gear, two gears mounted freely on the other end of said shaft, a resilient means for connecting the last two gears to the shaft, whereby the gears are permitted to rotate with the shaft when the gear is operated by the spring, a gear controlled by the clutch for operating the two gears, and a hand carrying gear operated by one of the last two gears, whereby when the spring is being wound, the latter gear is moved in one direction and is moved in the opposite direction when the spring is unwinding.

2. The combination with a main spring and barrel, and means for winding the same, of an indicator for the main spring, including a normally open clutch, means connected to the winding arbor for closing the clutch as the spring is being wound, a shaft, coöperable means carried by the barrel and shaft, whereby the shaft is rotated as the spring is unwinding, a hand carrying arbor, means carried by the shaft and connected to the clutch, whereby motion in two directions is imparted to the hand carrying arbor, said last means including two gears freely rotatable upon the shaft, one of said gears being engageable with the clutch, and the other with the hand carrying arbor, and a spring interposed between the gears and shaft for holding the gears fixed to the shaft when the arbor is being operated by the winding barrel.

3. The combination with a spindle, and a barrel rotatable thereon, of a pointer operating gear, a second gear meshing with the said gear and journaled for rotation upon said spindle, the second gear having a clutch member, a second clutch member feathered upon the spindle and coöperating with the first mentioned clutch member, spring means for separating said clutch members, cam means for moving the second clutch member into engagement with the first mentioned clutch member when the spindle is rotated, a shaft operatively connected to the barrel, the first mentioned gear being mounted for rotation upon said shaft, and friction means between said shaft and first mentioned gear tending to cause them to rotate together.

4. In a mechanism of the character described, a spring winding member, a spring actuated member, a pointer an operative connection between the pointer and one of said members including a normally open clutch, and means for closing said clutch when said member is rotated, and means operated by the other member for actuating the pointer when the clutch is open.

5. In a mechanism of the character described, a spring winding member, a spring actuated member, a pointer, an operative connection between the pointer and one of said members including a normally open clutch, and means for closing the clutch when said member is rotated, and an operative connection between the pointer and other member including friction means permitting of slippage when the clutch is closed.

In testimony that I claim the foregoing as my own, I have hereto affixed my signature in the presence of two witnesses.

CHARLES TESKE.

Witnesses:
ANDREW CHRESH,
J. A. PETERSON.

Copies of this patent may be obtained for five cents each, by addressing the "Commissioner of Patents, Washington, D. C."